United States Patent
Skurdal et al.

[19]

[11] Patent Number: 6,161,009
[45] Date of Patent: Dec. 12, 2000

[54] LATENCY TIME DETERMINATION SYSTEM FOR A TRANSCEIVER

[75] Inventors: Vincent C. Skurdal, Boise; Thomas O. Wheless, Jr., Eagle, both of Id.

[73] Assignee: Hewlett-Packard Company, Palo Alto, Calif.

[21] Appl. No.: 08/918,224

[22] Filed: Aug. 25, 1997

[51] Int. Cl.[7] .................................................. H04B 1/00
[52] U.S. Cl. ........................................ 455/423; 455/425
[58] Field of Search .............................. 702/79, 89, 176, 702/177; 455/423, 425; 359/152, 110, 154, 180, 189; 342/172, 173, 174, 165; 356/4.01, 5.01

[56] References Cited

U.S. PATENT DOCUMENTS

| | | | |
|---|---|---|---|
| 5,262,837 | 11/1993 | Shyy | 342/135 |
| 5,579,145 | 11/1996 | Bogdan et al. | 359/110 |
| 5,677,779 | 10/1997 | Oda et al. | 359/152 |
| 5,854,702 | 12/1998 | Ishikawa et al. | 359/152 |

FOREIGN PATENT DOCUMENTS 2 318 010  8/1998  United Kingdom .............. G01S 7/40

*Primary Examiner*—Nguyen Vo
*Assistant Examiner*—Makoto Aoki
*Attorney, Agent, or Firm*—Matthew L. Wade

[57] ABSTRACT

A system to determine the length of time, known as the latency time, that is required to wait between transmitting and receiving data for a half-duplex electromagnetic transceiver having a transmitter and receiver wherein the receiver is electromagnetically coupled to the transmitter. The determination of the latency time is accomplished by the use of a control circuit that operates to turn the transmitter to an on state. The control circuit then monitors the receiver to determine when the receiver also goes to an on state due to the electromagnetic coupling. The control circuit subsequently turns off the transmitter and the length of time for the receiver to recover to an off state is measured. This length of time is the latency time and is used in subsequent transmission of data.

16 Claims, 5 Drawing Sheets

LATENCY TIME DETERMINATION SYSTEM FOR A TRANSCEIVER

FIELD OF THE INVENTION

This invention relates to communication devices, and more particularly to communication devices employing a half-duplex electromagnetic transceiver operating in the infrared (IR) frequency range. These devices include printers and personal computing devices.

BACKGROUND OF THE INVENTION

Computing devices often have some sort of communication interface to provide communication capability to the outside world. In today's market place, these communication interfaces must be easy to use and have the ability to transmit and receive as many bits of information as possible over a given period of time. One type of communication interface that exists today allows communication without the use of wires by transmitting and receiving modulated IR radiation over an air medium. Devices that have this type of interface are often called IR devices. In order to permit IR communication between different brands and types of IR devices, industry wide standards have been developed by groups such as the Infrared Data Association (IRDA).

FIG. 1 depicts a prior art IR device 17 adhering to IRDA standards and having an IR transceiver 19. Transceiver 19 is comprised of IR receiver 23 and IR transmitter 21. The communication link between IR device 17 and a second IR device (also adhering to IRDA standards) is physically accomplished by the alignment of transceiver 19 with the transceiver of the second IR device in a manner that modulated IR radiation emitted from transmitter 21 is detected by the IR receiver of the second IR device. In addition, modulated IR radiation emitted from the IR transmitter of the second IR device is detected by receiver 23. The two IR devices interpret the detected modulated IR radiation as data and control packets in compliance to a predetermined standard set by the IRDA.

The distance between transmitter 21 and receiver 23 is mandated by an IRDA standard. This IRDA standard positions transmitter 21 relative to receiver 23 so that receiver 23 is able to detect IR radiation from transmitter 21. Receiver 23 is referred to as being IR coupled to transmitter 21.

The effect of IR coupling is illustrated in FIG. 2 in conjunction with FIG. 1. Turning now to FIG. 2, two waveforms are shown. The top waveform 37 depicts the status (on or off) of transmitter 21 (FIG. 1). The lower waveform 41 depicts the status (on or off) of receiver 23 (FIG. 1). When transmitter 21 (FIG. 1) is turned on at t=0 (43), transmitter 21 (FIG. 1) begins to emit IR radiation. Receiver 23 (FIG. 1) is IR coupled to transmitter 21 and therefore detects the IR radiation from transmitter 21 (FIG. 1) and becomes active after delay 33 at t=t1 (45). When transmitter 21 (FIG. 2) is turned off at t=t2 (47), receiver 23 (FIG. 1) no longer detects the IR radiation from transmitter 21 (FIG. 1) and therefore becomes inactive after delay 35 at t=t3 (49). Due to the IR coupling between transmitter 21 (FIG. 1) and receiver 23 (FIG. 1), transceiver 19 (FIG. 1) cannot both receive data and transmit data at the same time. As a result, transceiver 19 (FIG. 1) is referred to as a half-duplex transceiver.

Delay 33 and delay 35 shown in FIG. 2 are a result of the finite response time of receiver 23 (FIG. 1). This response time may vary between any two IR transceivers due to component variability resulting from manufacturing. Delay 35 is referred to as the latency time for IR device 17 (FIG. 1) and is a characteristic of IR transceiver 19. The latency time for IR device 1 7 (FIG. 1) is therefore the minimum length of time an external IR device (communicating with IR device 17 over an IR communication link) must wait between receiving data from IR device 17 (FIG. 1) and subsequently sending data to IR device 17 (FIG. 1).

During the initialization stage of an IR communication link between IR device 17 (FIG. 1) and the external device, the two devices will "negotiate" to determine and exchange various parameters in order to enable the subsequent exchange of data. This is referred to as the negotiation stage. A parameter exchanged during the negotiation stage is a latency time parameter (LTP). The LTP for IR device 17 (FIG. 1) is transferred from IR device 17 (FIG. 1) to the external device. The LTP for IR device 17 informs the external device the time required to wait between receiving and subsequently sending data to IR device 17 (FIG. 1) to allow for the latency time of IR device 17. Likewise, the LTP for the external device is transferred from the external device to IR device 17 and informs IR device 17 the time required to wait between receiving and subsequently sending data to the external device to allow for the latency time of the external device.

As indicated previously, the latency time may vary between any two IR transceivers as a result of differences in components as they are manufactured. To account for these component variances, IR transceiver manufacturers typically determine and publish a maximum latency time for each class of IR transceiver. As the name implies, the maximum latency time is a value that represents the upper limit for the distribution of latency times of every transceiver that is of the same class.

Previously, the LTP for a device was based on the maximum latency time published for the class of transceiver used in the device. Even though the latency time of many transceivers of a given class in fact is below the maximum latency time for the class, these improved devices are not utilized to their optimum in these systems.

SUMMARY OF THE INVENTION

Most transceivers of the same transceiver class have a latency time that may be 10 or more times less than the published maximum latency time for the class. As a result, using a LTP based on the maximum latency time as opposed to the actual latency time of the transceiver, results in reducing the data transfer rate of most IR devices.

For this reason there is a need for a system to determine the latency time for IR devices having transceivers that experience IR coupling.

The present invention is directed to a system for satisfying this need. The system described includes apparatus and method for determining the latency time for a half-duplex electromagnetic transceiver wherein the receiver is coupled to the transmitter. The system initially operates to turn the transmitter to an on state. The receiver is then monitored to determine when the receiver goes to an active state due to the IR coupling between the transmitter and the receiver. The transmitter is subsequently turned off and the length of time for the receiver to recover to an off state is measured. This measured length of time represents the latency time for the transceiver and is then used for subsequent transmission of data.

DETAILED DESCRIPTION OF THE INVENTION

The present invention is described in the following specification in the context of application to an IR communication interface. This invention has particular benefits for IR communication interfaces due to the effect of environment on the latency time of an IR transceiver. However, it should be distinctly understood that the present invention could also be implemented for other communication interfaces having a transmitter and a receiver wherein electromagnetic coupling occurs between the transmitter and the receiver.

The present invention is a system to measure the latency time of a transceiver. After the latency time is measured the latency time may then be converted to a latency time parameter (LTP) and used (instead of the maximum latency time) in subsequent data transmission. For purposes of this description, the LTP established by using this invention is referred to as an optimum LTP.

Figure 1:
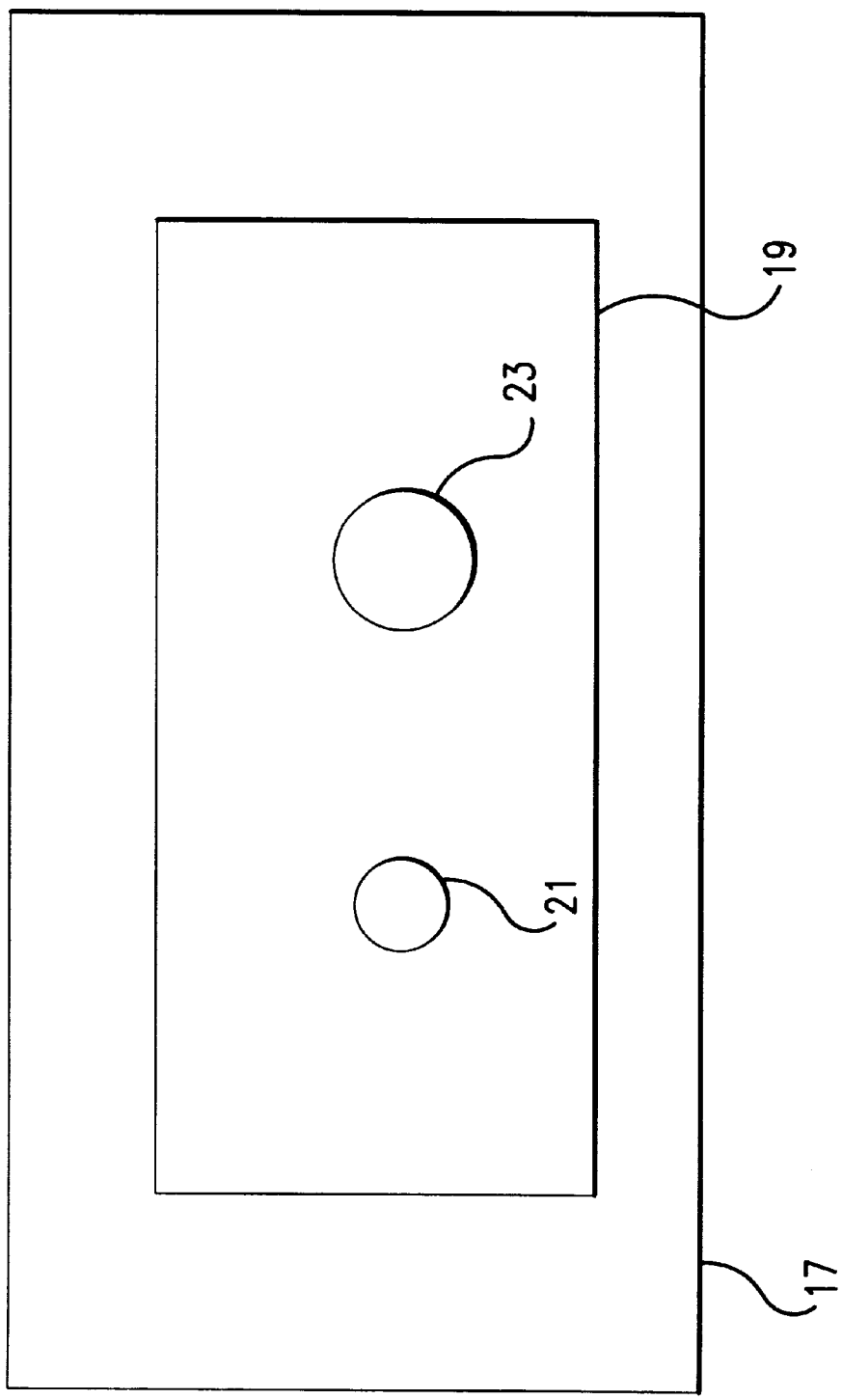
FIG. 1 is a perspective drawing of an IR transceiver to illustrate the effect of IR coupling.
Figure 2:
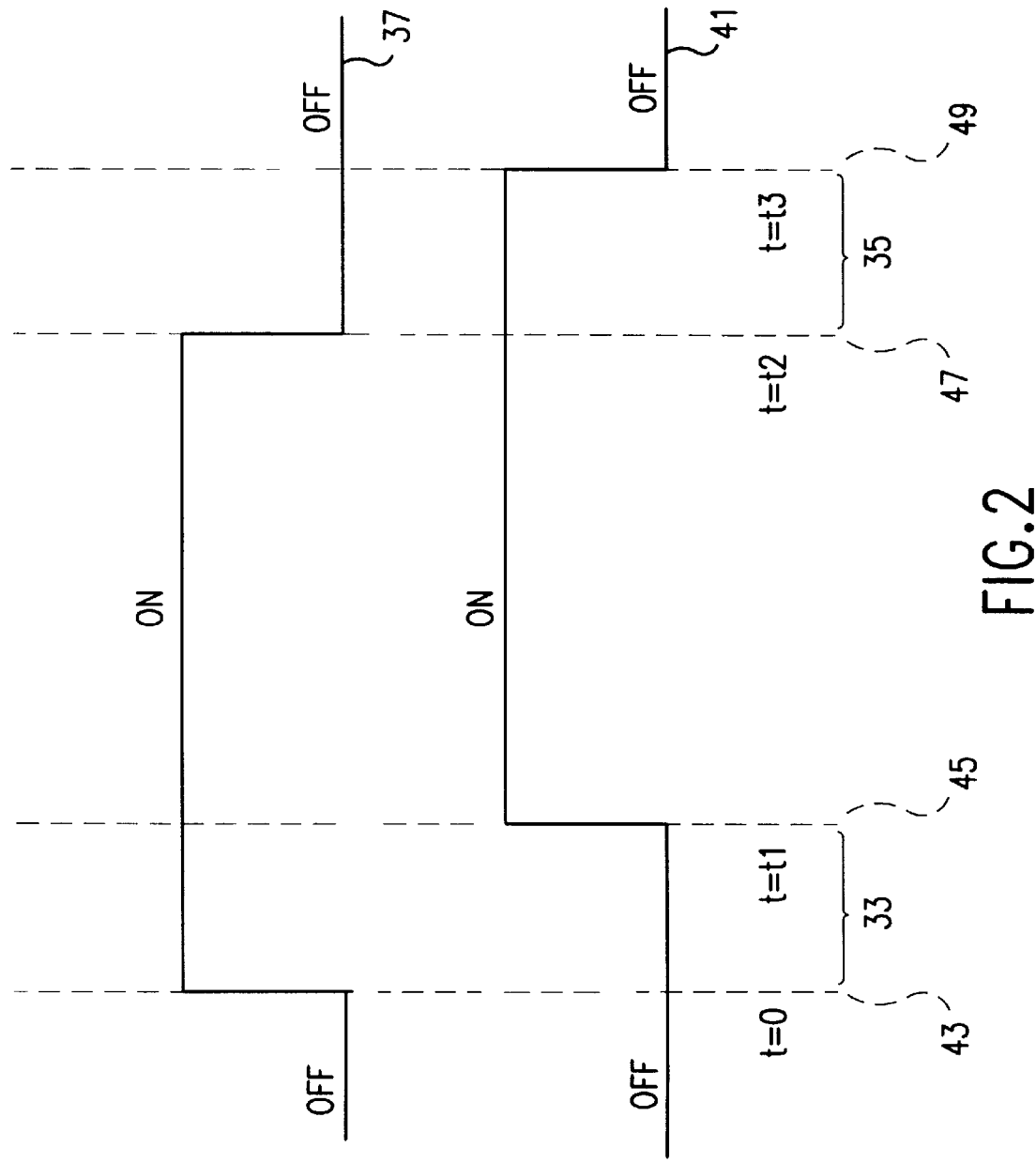
FIG. 2 is a timing diagram to illustrate the effect of IR coupling.
Figure 3:
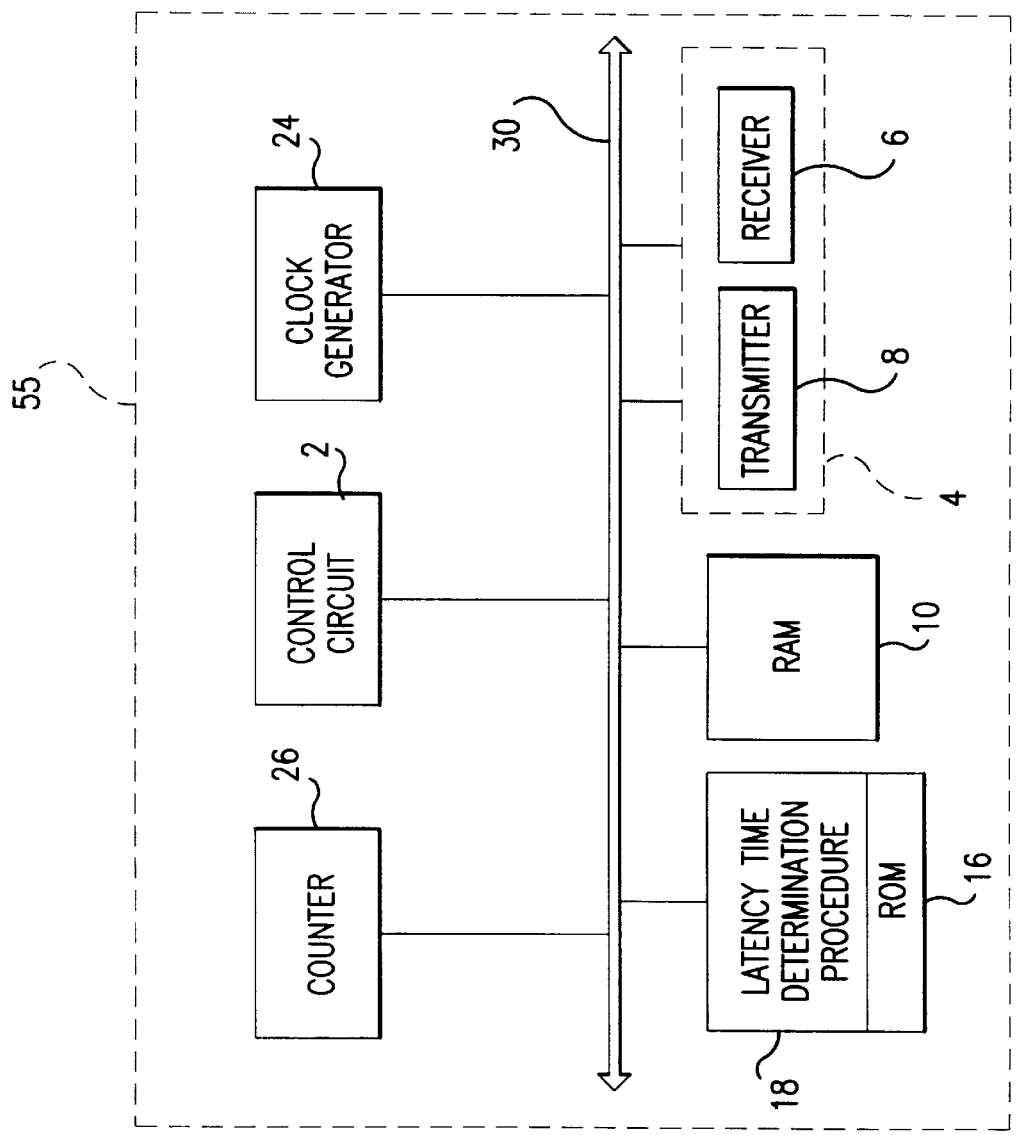
FIG. 3 is a block circuit diagram depicting the apparatus of the invention.

Referring now to FIG. 3, a block circuit diagram is shown of the invention comprising an IR device 55 having a control circuit 2, a random access memory (RAM) 10, a read only memory (ROM) 16, a clock generator 24, a counter 26 and a transceiver 4 each interconnected via bus 30. Transceiver 4 is comprised of an IR transmitter 8 and an IR receiver 6. Transmitter 8 emits IR radiation in response to a transmit-on command sent to transmitter 8 by control circuit 2 via bus 30. Receiver 6 responds to the IR radiation from transmitter 8 by generating a DETECT signal and transmitting the DETECT signal to control circuit 2 via bus 30. Clock generator 24 generates clock cycles and transmits the clock signals to control circuit 2 via bus 30.

ROM 16 includes a latency time determination procedure 18, which is utilized by control circuit 2 to measure the latency time of transceiver 4. RAM 10 is connected to control circuit 2 via bus 30 and is intended to hold the measured latency time of transceiver 4.

The operation of the system commences when control circuit 2 using the determination procedure 18 sends transmitter 8 a transmit-on command thereby causing transmitter 8 to emit IR radiation. Control circuit 2 then begins to monitor receiver 6 for a DETECT signal. Upon receiving the DETECT signal, control circuit 2 turns off transmitter 8 by removing the transmit-on command and begins to increment counter 26 for each clock cycle generated by clock generator 24. When control circuit 2 no longer receives the DETECT signal from receiver 6, control circuit 2 stops incrementing counter 26. Control circuit 2 then multiplies the value of counter 26 by the period of the clock cycle and stores this value into RAM 10. This value represents the measured latency time of transceiver 4.

In the preferred embodiment control circuit 2 is a microprocessor and the latency time determination procedure 18 is implemented in software. In addition, the latency time is measured during every negotiation stage between IR device 55 and another IR device.

In a further aspect of this invention, the value in RAM 10 is converted to an optimum LTP. This is accomplished by control circuit 2 increasing the value stored in RAM 10 by approximately 15 percent. The value of 15 percent is a safety factor and is used to account for any latency time measurement errors. During a negotiation stage between IR device 55 and a second IR device this value is transferred from IR device 55 to the second IR device for use by the second IR device as the LTP for IR device 55.

Figure 4:
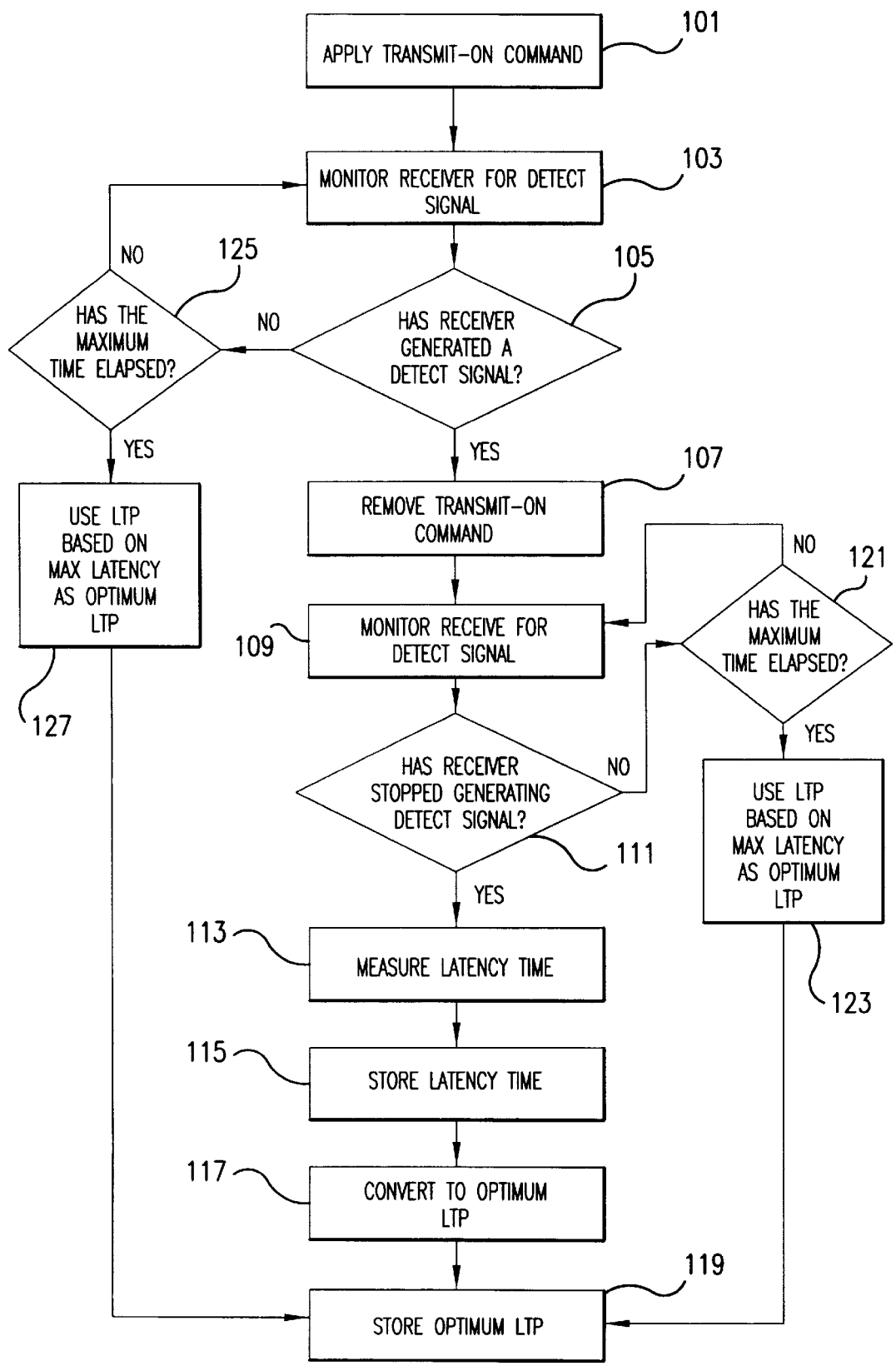
FIG. 4 is a flow diagram depicting a method for measuring latency time.

Turning now to FIG. 4, a method for measuring latency time for a transceiver of an IR device is depicted. The transceiver is comprised of a transmitter and a receiver. As shown in box 101, the first step of the method is to apply to the transmitter a transmit-on command causing the transmitter to emit IR radiation. The receiver is then monitored for the generation of a DETECT signal as shown in box 103. If the receiver has not generated a DETECT signal (decision box 105) and a maximum time limit has not elapsed (decision box 125) then the receiver is again monitored for a DETECT signal, as shown in box 103. If the receiver has not generated a signal (decision box 105) and the maximum time limit has elapsed (decision box 125) then a LTP based on the maximum latency time is calculated as shown in box 127 and stored as shown in box 119. In the preferred embodiment the maximum time limit is predetermined and is based on the maximum latency time for the transceiver.

If the receiver generates the DETECT signal (decision box 105), the transmit-on command is removed from the transmitter thereby causing the transmitter to cease emitting IR radiation, as shown in box 107. The receiver is then monitored to determine when the DETECT signal is no longer generated, as shown in box 109. If the receiver is generating the DETECT signal (decision box 111) and the maximum time limit has not expired (decision box 121) then the receiver is monitored as shown in box 109. If the receiver is generating the DETECT signal (decision box 111) and the maximum time limit has expired (decision box 121) a LTP based on the maximum latency time is calculated as shown in box 123 and stored as shown in box 119. If the receiver is not generating the DETECT signal (decision box 111), the time is measured from removing the transmit-on command from the transmitter, as shown in box 113. This time is the latency time of the transceiver and is subsequently stored, as shown in box 115. In a further aspect of this invention, the stored latency time is converted to an optimum LTP for the IR device by increasing the measured latency time by a safety factor, typically in the range of 10–20 percent, preferably approximately 15 percent, as shown in box 117. The optimum LTP is then stored as shown in box 119. During a negotiation stage between the IR device and an external IR device the optimum LTP is transferred from the IR device to the external device and used by the external IR device as the LTP for the IR device in subsequent data exchange.

Using the apparatus or method just described for establishing a LTP has the advantage of increasing data transfer rate capability for an IR device. An example will illustrate this advantage. A first and second IR device (communicating at a commonly used data transfer rate) is capable of transmitting one data packet (consisting of up to 2048 bytes of data) in 4.1 milliseconds. For this example, the IR transceivers used in both devices are each part of a class of IR transceivers having a maximum latency time of 1 millisecond. Also, each IR transceiver has an typical latency time of 100 microseconds. If the LTP used for both IR devices was established by using the maximum latency time (i.e., 1 millisecond), each IR device waits at least 1 millisecond between receiving a packet of data and subsequently sending a packet of data to the other device. This represents approximately 19.6 percent ((1 millisecond÷5.1 milliseconds)×100)

of the total transmission time of a data packet or a total data transmission bandwidth utilization of only 80.4 percent (100−19.6).

However, if the LTP is established using the present invention, each IR device waits only 115 microseconds (100 microseconds+0.15×100 microseconds) between receiving a packet of data and subsequently sending a packet of data to the other IR device. This represents approximately 2.7 percent (0.115 milliseconds÷4.2 milliseconds)×100) of the total transmission time of a data packet or a data transmission bandwidth utilization of 97.3 percent (100−2.7). This is a net gain in bandwidth utilization of approximately 16.9 percent (97.3−80.4) as compared to using the maximum latency time to establish a LTP.

Figure 5:
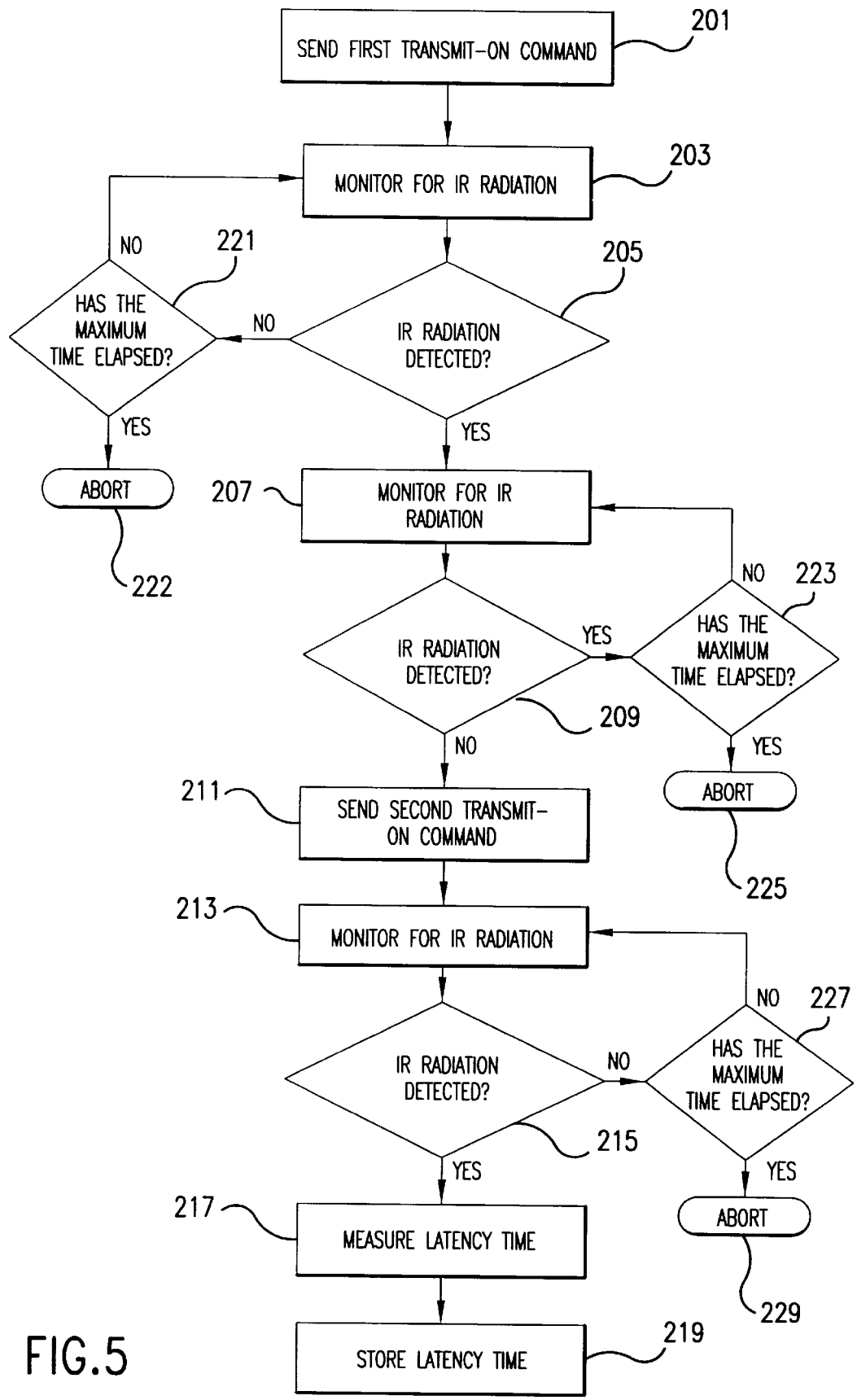
FIG. 5 is a flow diagram depicting a method for estimating latency time for a second IR device.

Turning now to FIG. 5, a method for measuring latency time for a second transceiver of a second IR device during a negotiation stage between a first IR device and the second IR device is depicted. The second transceiver is comprised of a transmitter and a receiver. As shown in box 201, the first step is for the first IR device to apply to the second IR device a first transmit-on command. The second IR device is responsive to the first transmit-on command by causing the transmitter to emit IR radiation for a period of time that is long enough to ensure the receiver detects the IR radiation. In the preferred embodiment this period is about 0.5 milliseconds. After the first transmit-on command is applied, the first IR device monitors the transmitter for IR radiation, as shown in box 203. If IR radiation is not detected (decision box 205) and a maximum time has not elapsed (decision box 221) then the first IR device continues to monitor the transmitter for IR radiation as shown in box 203. If IR radiation is not detected (decision box 205) and the maximum time has elapsed (decision box 221) then the method is aborted as shown in box 222. In the preferred embodiment, the maximum time is predetermined and is based on the maximum latency time for the first IR device.

If IR radiation is detected (decision box 205) then the first IR device continues to monitor the transmitter as shown in box 207. If IR radiation is detected (decision box 209) and the maximum time has not elapsed (decision box 223) then the first IR device continues to monitor for IR radiation as shown in box 207. If the maximum time has elapsed (decision box 223) then the method is aborted as shown in box 225.

If IR radiation is not detected (decision box 209) the first IR device sends a second transmit-on command, as shown in box 211. The second IR device is capable of receiving the second transmit-on command after the latency time of the second transceiver and thereafter causing the transmitter to emit IR radiation. The first IR device then monitors the transmitter for IR radiation, as shown in box 213. If IR radiation is not detected (decision box 215) and the maximum time has elapsed (decision box 227) the method is aborted. If IR radiation is not detected (decision box 227) and the maximum time has not elapsed then the first IR device again monitors the transmitter for IR radiation, as shown in box 213. If the first IR device detects IR radiation (decision box 215) the time is measured between sending the last second transmit-on command and when IR radiation was first detected, as shown in box 217. This measured time is an estimate of the latency time for the second IR device. The estimated latency time is then stored as shown in box 219. In a further aspect of this invention, this value may then be used as the LTP for the second IR device in subsequent communication between the first IR device and the second IR device.

The method just described has the distinct advantage of enabling the measurement of latency time for an older IR device by an external IR device. This enables improved communication within and between devices without the benefit of having the presently invented circuit installed. In this implementation, a newer device, such as a printer, has the inventive circuit. The LTP for that printer is established in accord with FIG. 4. Thereafter, in communication with an older device, such as a palmtop, not having the latency detect circuitry therein, the printer tests the palmtop for the latency time of that unit. Thereafter the printer circuitry computes an optimum LTP for the palmtop and communication between the unit is improved in both directions, all in accordance with FIG. 5.

It should be understood that the foregoing description and examples used herein are only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. An apparatus for measuring latency time for a transceiver, comprising:

(a) a transmitter aspect of said transceiver, responsive to a transmit-on command by emitting electromagnetic radiation and responsive to removal of said transmit-on command by ceasing to emit said electromagnetic radiation;

(b) a receiver aspect of said transceiver, responsive to said electromagnetic radiation by generation of a resultant signal; and (c) measuring apparatus connected to said receiver aspect and said transmitter aspect, capable of applying said transmit-on command to said transmitter aspect, sensing said resultant signal and thereafter removing said transmit-on command and measuring the time between removing said transmit-on command and said resultant signal no longer sensed; and wherein said transmitter aspect and said receiver aspect operate predominately in the infrared frequency range and said capability of said measuring apparatus active during a negotiation stage.

2. An apparatus as recited in claim 1, wherein said capability of said measuring apparatus active prior to a negotiation stage.

3. An apparatus as recited in claim 1 including a memory wherein said measuring apparatus further comprises a microprocessor that cooperates with said memory.

4. An apparatus as recited in claim 2 including a memory, wherein said measuring apparatus further comprises a microprocessor that cooperates with said memory.

5. A method for measuring latency time for a transceiver, comprising the steps of:

(a) applying a transmit-on command to a transmitter aspect of said transceiver, said transmitter aspect responsive to said transmit-on command by emitting electromagnetic radiation;

(b) receiving a resultant signal from a receiver aspect of said transceiver, said receiver aspect responsive to said electromagnetic radiation to generate said resultant signal and if said resultant signal is generated within a first maximum time limit, then;

(c) removing said transmit-on command from said transmitter aspect after receiving said resultant signal, said transmitter aspect thereby ceasing to generate said electromagnetic radiation;

(d) determining when said resultant signal is no longer present and if said resultant signal is generated within a second maximum time limit, then;

(e) measuring the time between step (c) and result of step (d).

6. The method as recited in claim 5 wherein said method includes the further step of converting result of step (e) into a LTP for use in subsequent communication.

7. A method for establishing and transferring an optimum LTP for a first and second device each having a transceiver, comprising:

(a) applying a first transmit-on command to a first transmitter aspect of said first transceiver, said first transmitter aspect responsive to said first transmit-on command by emitting electromagnetic radiation;

(b) receiving a first resultant signal from first receiver aspect of said first transceiver, said first receiver aspect responsive to received electromagnetic radiation by generating said first resultant signal and if said first resultant signal is generated within a first maximum time limit, then;

(c) removing said first transmit-on command from said first transmitter aspect after receiving said first resultant signal, said first transmitter aspect responsive to removing said first transmit-on command by ceasing to generate electromagnetic radiation;

(d) determining when said first resultant signal is no longer present and if said first resultant signal is no longer present within a second maximum time limit, then;

(e) measuring the time between step (c) and result of step (d);

(f) converting the result of step (e) into a first optimum LTP; and (g) transferring said first optimum LTP to said second device for use in subsequent communication between said second device and said first device.

8. The method as recited in claim 7, further comprising the steps of:

(h) applying a second transmit-on command to a second transmitter aspect of said second transceiver, said second transmitter aspect responsive to said second transmit-on command by emitting electromagnetic radiation;

(i) receiving a second resultant signal from a second receiver aspect of said second transceiver said second receiver aspect responsive to received electromagnetic radiation by generating said second resultant signal and if said resultant signal is generated within a third maximum time limit, then;

(j) removing said second transmit-on command from said second transmitter aspect after receiving said second resultant signal, said second transmitter aspect responsive to removing said second transmit-on command by ceasing to generate electromagnetic radiation;

(k) determining when said second resultant signal is no longer present and if said second resultant signal is no longer present within a fourth maximum time limit, then;

(l) measuring the time between step (j) and result of step (k);

(m) converting the result of step (l) into a second optimum LTP; and (n) transferring said second optimum LTP to said first device for use in subsequent communication between said second device and said first device.

9. The method as recited in claim 7 wherein steps (a)–(g) are performed prior to a negotiation stage between said first device and said second device.

10. The method as recited in claim 8 wherein steps (a)–(g) and steps (i)–(n) are performed prior to a negotiation stage between said first device and said second device.

11. The method as recited in claim 7 wherein said method is performed during a negotiation stage between said first device and said second device.

12. The method as recited in claim 8 wherein said method is performed during a negotiation stage between said first device and said second device.

13. A method for increasing the communication rate between a first device having a first transceiver and a second device having a second transceiver, comprising:

(a) initializing a negotiation stage;

(b) measuring the latency time of the first transceiver during the negotiation stage; and (c) determining an optimum LTP from the measured latency time.

14. The method as recited in claim 13, further including the steps of:

(d) said second device using the optimum LTP as the latency parameter for communication with the first device.

15. A method for estimating latency time for a device having a transceiver, comprising:

(a) sending a first transmit-on command to said device, said device responsive to said transmit-on command by causing a transmitter aspect of said transceiver to emit electromagnetic radiation for a period of time long enough for a receiver aspect of said transceiver to detect said electromagnetic radiation and if said transmitter aspect emits said electromagnetic radiation within a first maximum time limit, then;

(b) determining the end of said period of time;

(c) sending to said receiver aspect a second transmit-on command at the end of said period of time and if within a second maximum time limit, then;

(d) determining if said receiver aspect detects said second transmit-on command, if not then repeating steps (b) and (c);

(e) measuring the time between the last performance of step (d) and the end of said period of time.

16. The method as recited in claim 15 wherein said method is performed by an external device.

* * * * *